United States Patent
Ghannam et al.

(10) Patent No.: US 10,773,683 B1
(45) Date of Patent: Sep. 15, 2020

(54) OCCUPANT SEATBELT STATUS

(71) Applicant: FORD GLOBAL TECHNOLOGIES, LLC, Dearborn, MI (US)

(72) Inventors: Mahmoud Ghannam, Canton, MI (US); William J. Olsen, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/537,927

(22) Filed: Aug. 12, 2019

(51) Int. Cl.
  *B60Q 1/00* (2006.01)
  *B60R 22/48* (2006.01)
  *B60R 21/015* (2006.01)
  *G06K 9/00* (2006.01)

(52) U.S. Cl.
  CPC ........ *B60R 22/48* (2013.01); *B60R 21/01538* (2014.10); *B60R 21/01544* (2014.10); *G06K 9/00838* (2013.01); *B60R 2022/4866* (2013.01)

(58) Field of Classification Search
  CPC ........ G06K 9/00; G06K 9/00832; B60Q 1/00; B60R 22/48; B60R 21/01548; B60R 21/01566; B60R 2022/485; G06T 7/004; B60N 2/0252
  See application file for complete search history.

(56) References Cited

U.S. PATENT DOCUMENTS

| | | | |
|---|---|---|---|
| 9,365,186 B2 * | 6/2016 | Gulash | B60R 22/48 |
| 9,796,303 B1 * | 10/2017 | Schonfeld | B60Q 5/005 |
| 10,501,048 B2 * | 12/2019 | Szawarski | G06K 9/00362 |
| 2007/0195990 A1 | 8/2007 | Levy | |
| 2015/0077556 A1 | 3/2015 | Reed | |
| 2016/0159320 A1 * | 6/2016 | Andreen | B60R 22/48 382/103 |
| 2019/0152418 A1 * | 5/2019 | Coughlin | B60N 2/0252 |

FOREIGN PATENT DOCUMENTS

| | | |
|---|---|---|
| CN | 102874210 A | 1/2013 |
| CN | 208053210 U | 11/2018 |

OTHER PUBLICATIONS https://www.ncbi.nlm.nih.gov/pmc/articles/PMC5427714/, Bell, J.L. et al., Evaluation of an In-Vehicle Monitoring Systems (IVMS) to Reduce Risky Driving Behaviors in Commercial Drivers: Comparison of In-Cab, Feb. 2017.

* cited by examiner

*Primary Examiner* — Toan N Pham
(74) *Attorney, Agent, or Firm* — Frank L. Lollo; MacMillan, Sobanski & Todd, LLC

(57) ABSTRACT

A vehicle employing a method of detecting seatbelt status in a vehicle may include detecting occupants entering the vehicle and taking first seat images with a camera upon detecting the vehicle may begin travel imminently. The first seat images are analyzed to detect the occupants, with LEDs activated on seatbelt assemblies for seats with the occupants. Activation of the LEDs is changed for respective seats with the occupants upon detecting seatbelt engagement for the corresponding seat, and second seat images are taken upon detecting that the vehicle is shifted into gear. The first and second seat images are compared, and an alert is activated when the comparison of first and second seat images indicates improper seatbelt use for one of the seats with the occupants. Fault conditions may also be detected.

15 Claims, 4 Drawing Sheets

OCCUPANT SEATBELT STATUS

BACKGROUND OF THE INVENTION

The present invention relates to a motor vehicle and more particularly to detecting a seatbelt status for an occupant of the vehicle.

Automotive vehicles today generally come equipped with airbags to protect vehicle occupants. An input to the systems that deploy the airbags may be whether the vehicle occupants are wearing seatbelts. One way to detect seatbelt usage is monitoring seat belt buckle switches to identify the latching status of the buckle. Some vehicle occupants have developed workarounds for such detection by buckling the seatbelt and sitting on it rather than wearing the seatbelt. Accordingly, it may be desirable to better detect seat belt usage for vehicle occupants.

SUMMARY OF THE INVENTION

An embodiment contemplates a method of detecting seatbelt status in a vehicle comprising: taking first seat images with a camera upon detecting the vehicle may begin travel imminently; analyzing the first seat images to detect occupants in the seats; activating LEDs on seatbelt assemblies for seats with the occupants; changing activation of the LEDs for respective seats with the occupants upon detecting seatbelt engagement for the corresponding seat; taking second seat images upon detecting that the vehicle is shifted into gear; comparing the first and second seat images; and activating an alert when the comparison of first and second seat images indicates improper seatbelt use for one of the seats with the occupants.

An embodiment contemplates a method of detecting seatbelt status in a vehicle comprising: detecting occupants entering the vehicle; taking first seat images with a camera upon detecting all doors of the vehicle are closed; taking second seat images with the camera upon detecting an ignition is turned on; analyzing the first and second seat images to detect occupants in seats; activating LEDs on seatbelt assemblies for the seats with the occupants; changing activation of the LEDs for the respective seats with the occupants upon detecting seatbelt engagement for the corresponding seat; taking third seat images upon detecting that the vehicle is shifted into gear; comparing the third seat images to the first and second seat images; and activating an alert when the comparison of the first, second and third seat images indicates improper seatbelt use for one of the seats with the occupants.

An advantage of an embodiment is that an accurate detection of a vehicle occupant using a seatbelt is accomplished, while minimizing occupant workarounds for not wearing a seatbelt. Additionally, costs may be reduced if employing LED lights and cameras that are already used for other vehicle functions, while eliminating the need for a seatbelt buckle switch.

DETAILED DESCRIPTION

Figure 1:
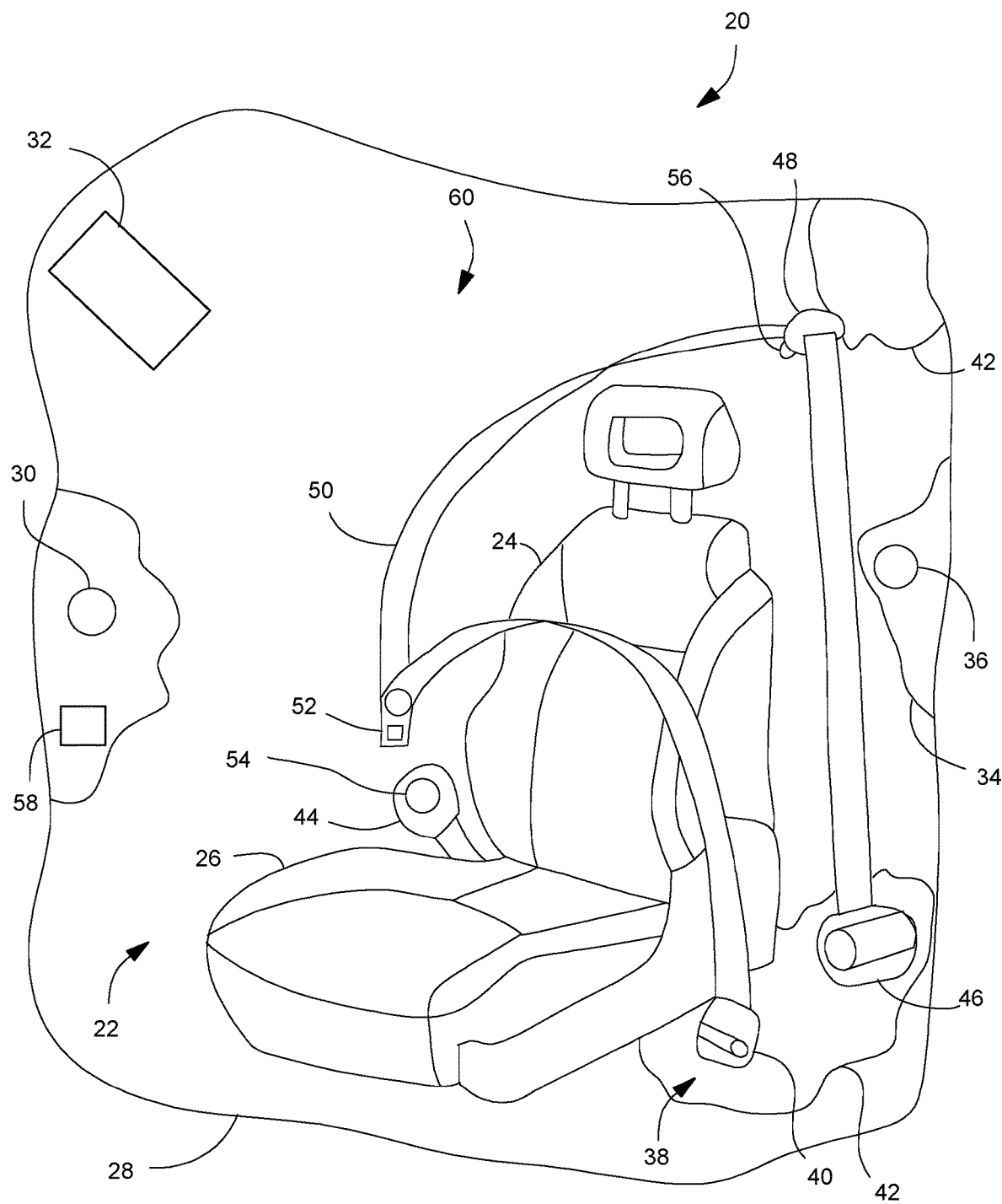
FIG. 1 illustrate a schematic perspective view of a portion of a vehicle.

FIG. 1 illustrates a portion of a vehicle 20 that includes a seat 22 having a seat back 24 and a seat bottom 26, which is mounted to the vehicle 20. While one exemplary seat 22 is shown, the vehicle 20 may of course have multiple seats in a passenger compartment 28. The seat 22 may be adjacent to a door 34, which may include a door open (ajar) sensor 36 that detects whether the door 34 is open or closed.

The vehicle 20 may also include an ignition 30 for starting the vehicle 20. The ignition 30 may employ for example a key, a key fob, a cell phone or other similar device for staring the vehicle 20.

One or more cameras 32 may be directed towards the seats 22 in the passenger compartment 28. These cameras 32 may be configured to be able to detect occupancy of a particular seat 22 by a vehicle occupant as well as detecting lights (discussed below) within the passenger compartment 28.

The vehicle 20 may also include a seatbelt assembly 38 associated with each vehicle seat 22. The seatbelt assembly 38 may include an anchor 40 secured to vehicle structure 42, a buckle 44 secured to vehicle structure on the opposed side of the seat bottom 26, a retractor 46 secured to the vehicle structure 42 adjacent to the door 34, and a D-ring 48 attached to vehicle structure 42 above the retractor 46. The D-ring 48 may have a height adjuster if so desired. The seatbelt assembly 38 may also include webbing 50 that is secured to the anchor 40, slidably extends through a tongue 52 that selectively secures to the buckle 44, slidably extends through the D-ring 48 and is retractably wound into and secured to the retractor 46.

Lighting, such as with light emitting diodes (LEDs) for example, may be mounted on components of the seatbelt assembly 38. For example, an LED 54 may be mounted to the buckle 44 and in view of the camera 32, and another LED 56 may be mounted on the D-ring 48, also in view of the camera 32. While referring to these LEDs 54, 56, one will note that each location may have more than one LED that may be arranged in a pattern and that the LEDs may be able to change color. Additional LEDs may be mounted on or adjacent to other components of the seatbelt assembly 38 if so desired. Also, the LEDs and camera detection of them may be employed with the other seats in the passenger compartment 28 as well.

The vehicle 20 may also include one or more onboard processors (CPU) 58 that communicate with and control the various components that are employed as part of an occupant seatbelt status system 60, such as for example the ignition 30, cameras 32, door ajar sensors 36, buckle 44, buckle LED 54 and D-ring Led 56. The CPU 58 may be made up of various combinations of hardware and software that is known to those skilled in the art, including memory for storing images captured by the cameras 32.

Figure 2A:
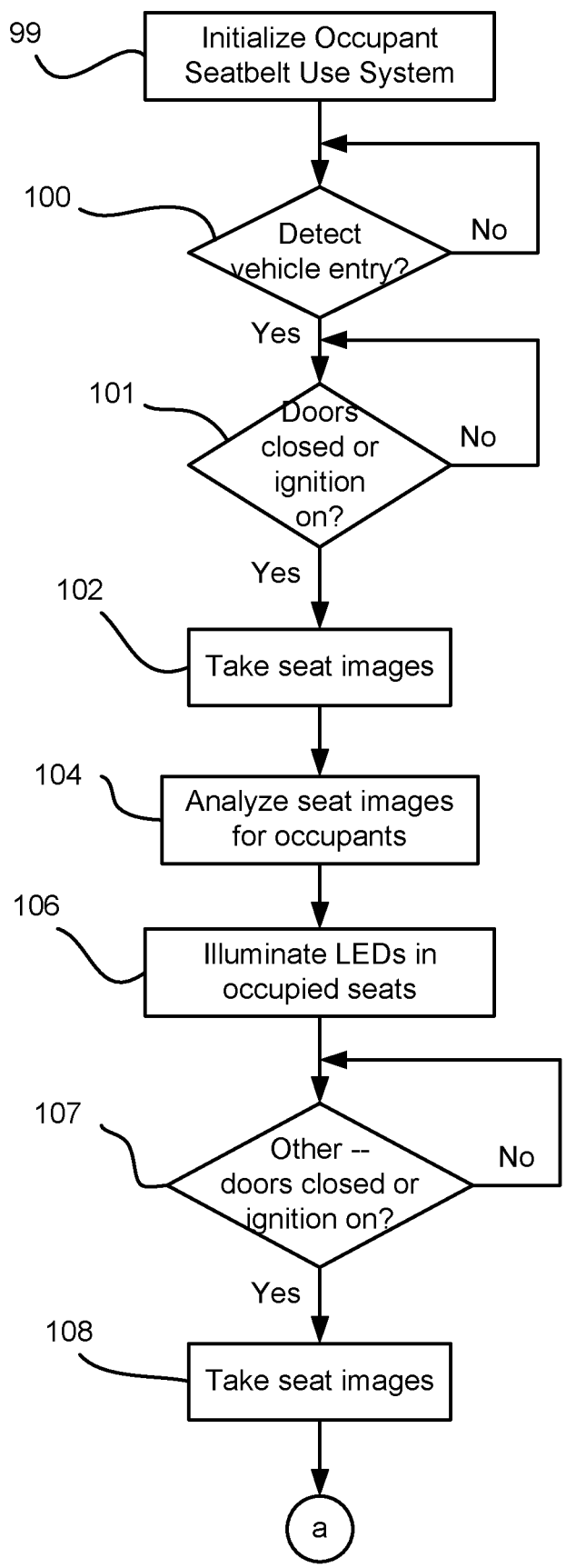
FIGS. 2A-2C show a flow chart illustrating operation of an occupant seatbelt status system.
Figure 2B:
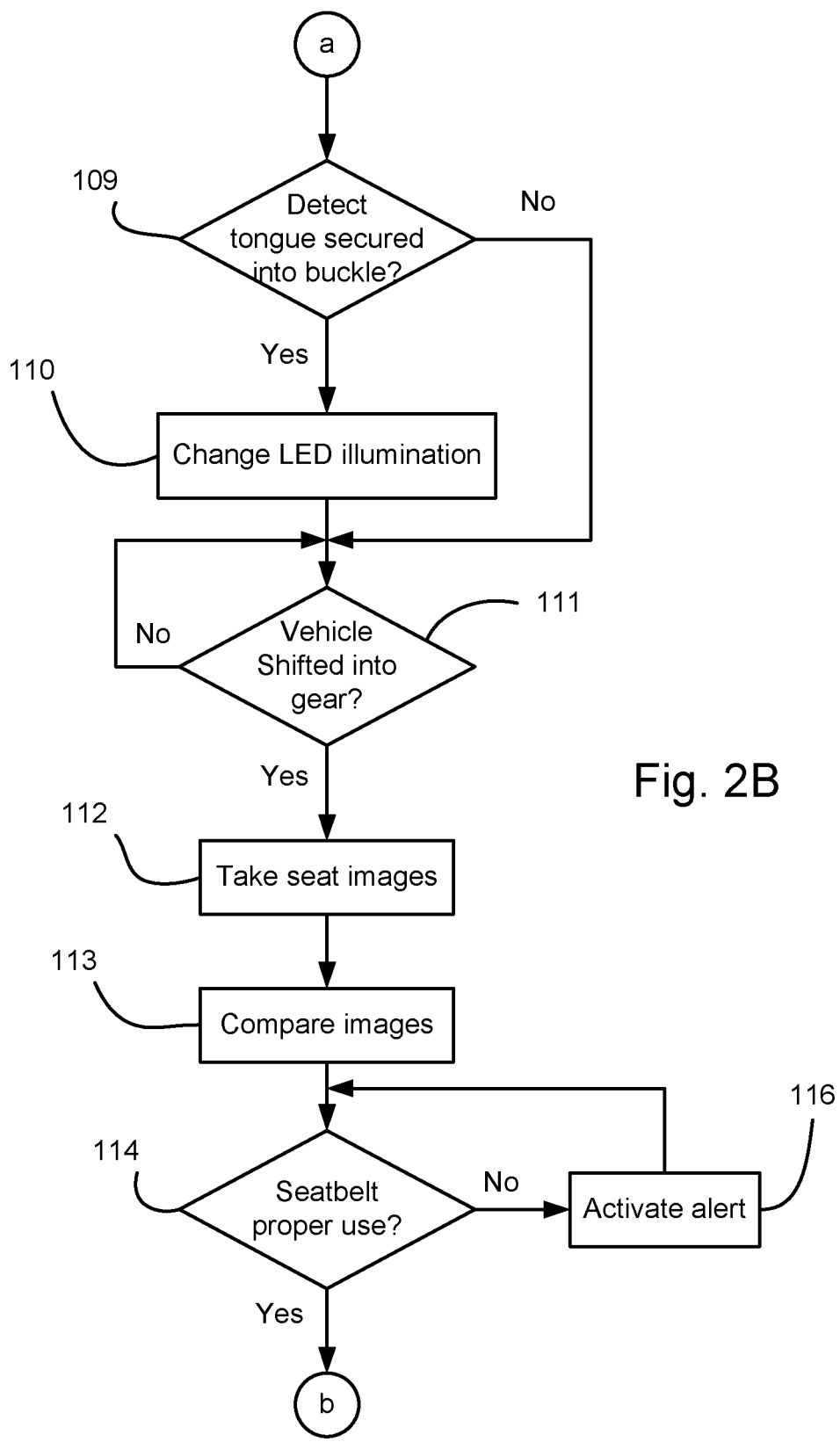
Figure 2C:
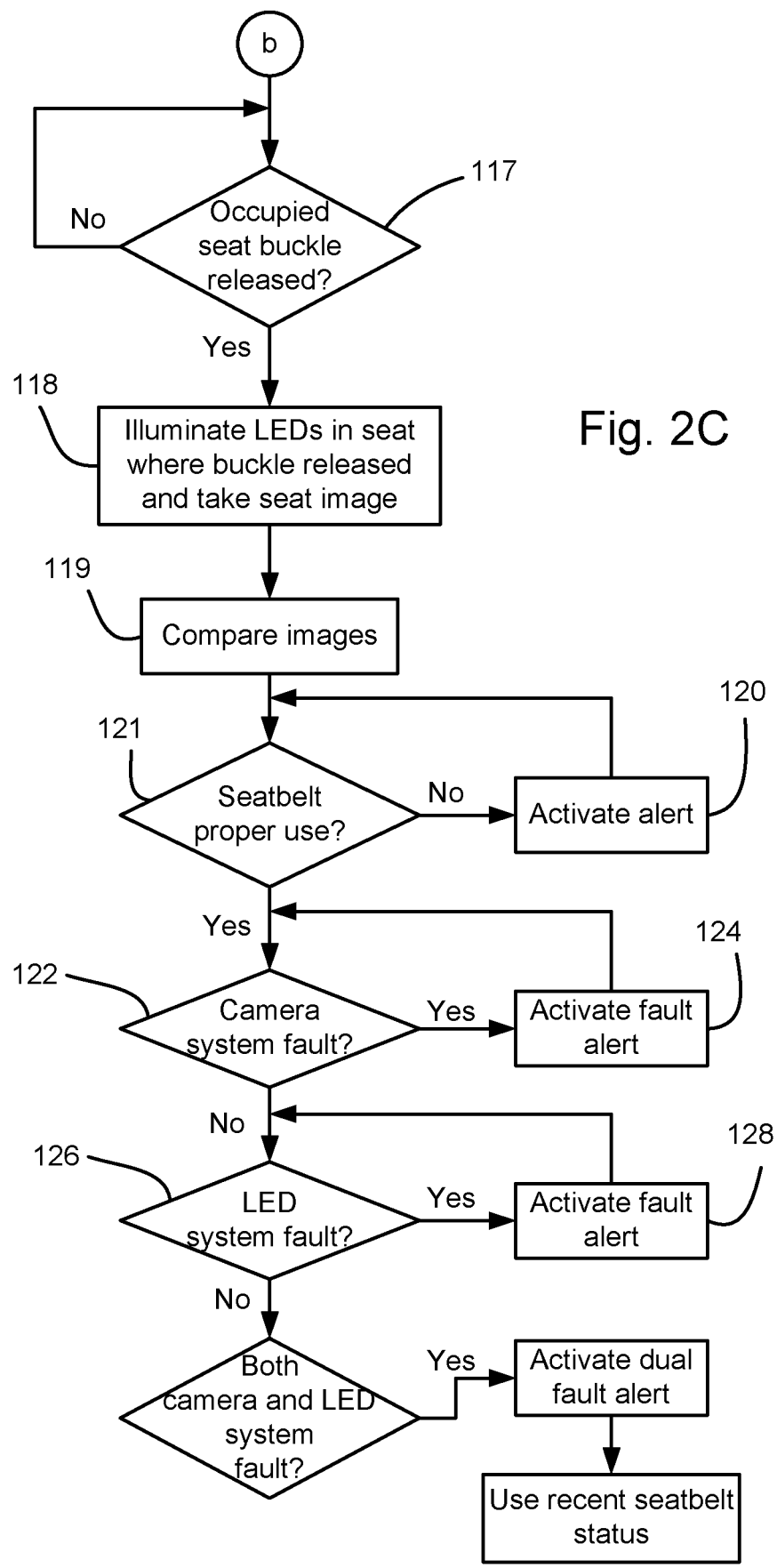

FIGS. 2A-2C (discussed in view of FIG. 1) illustrates an operation of the occupant seatbelt status system 60. After an ignition on/ignition off sequence, the system 60 may initialize to begin a new detection of occupant seatbelt use, step 99.

The system 60 may detect when the vehicle door(s) 34 open and occupant(s) enter the vehicle 20, step 100. This may include, for example, detecting weight on the seat bottom 26 after a door 34 is opened; although other means of detecting occupants entering the vehicle 20 may be employed instead or in addition to this, if so desired. When all of the doors 34 are then closed or the ignition 30 is turned on, whichever occurs first, step 101, the cameras 32 take an image for each seat 22, which may be stored in memory of the CPU 58, step 102. Closing the doors 34 or turning on the ignition 30 after people enter the vehicle 20 generally indicates that occupants may be travelling in the vehicle 20 soon and so are convenient triggers for employing the cameras 32. The CPU 58 analyzes the images and detects which seats 22 have occupants, step 104. Since analyzing images to detect a human are known to those skilled in the art, this detection will not be discussed in more detail herein. For seats 22 that are occupied, the LEDs 54, 56 may be illuminated, step 106.

When the other of all of the doors 34 being closed or the ignition 30 being turned on occurs, step 107, the cameras 32 take another image for each seat 22, which may be stored in the memory of the CPU 58, step 108. For each occupied seat 22, when the tongue 52 being secured into the buckle 44 is detected, step 109, the LED illumination for that seat 22 changes, step 110. Such a change in illumination may include for example turning off the LEDs 54, 56 for that seat 22, changing the color of the LEDs 54, 56 for that seat 22 and/or changing a pattern of illumination for the LEDs 54, 56 for that seat 22.

When the vehicle 20 is shifted out of Park (or Neutral) into gear (such as Drive or Reverse), step 111, the cameras 32 take an image for each occupied seat 22, step 112. The CPU 58 then compares this latest image with the earlier images, step 113, to detect if all seatbelts 38 for all occupied seats 22 are properly in use, step 114. If one or more of the seatbelts 38 for the occupied seats 22 are not on properly, then an alert is activated indicating an improper seatbelt use, step 116. This alert may be for example an audible sound broadcast in the passenger compartment 28, a light illuminated on a vehicle instrument panel, flashing of the LEDs 54, 56 on the seat 22 with improper seatbelt usage, or some other type of alert that will notify occupants of the improper usage.

If, during vehicle operation, a buckle 44 of an occupied seat 22 is released, step 117, then the LEDs 54, 56 for this seat 22 may be reactivated and another image taken by the camera 32, step 118. The CPU 58 again compares images, step 119, and if an improper seatbelt use is detected for this seat 22, step 121, the alert is again activated until proper seatbelt use is detected, step 120. This monitoring for the buckle 44 being released may, for example, include periodic camera images taken to detect the release of the seatbelt buckle, if so desired.

During operation of the occupant seatbelt status system 60, monitoring for system fault conditions may also be employed. For example, if a camera 32 is detected as being blocked from taking an image of the seat 22 or the camera 32 issues a fault error signal, step 122, then a fault alert may be issued. The fault alert may be for example the LEDs 54, 56 for that seat 22 blinking on-off and an audible warning occurring until the fault condition or blockage of view have been remedied, step 124. Also, if one of the LEDs indicates a fault condition, step 126, then a fault alert may be issued, step 128. The fault alert may be for example and audible warning and/or a warning illuminated on an instrument panel of the vehicle 20. If a fault for both the cameras 32 and the LEDs 54, 56 are detected, step 130, then an alert may issue and the most recent seat belt status detected from before the faults may be used until the fault condition are corrected, step 132.

While certain embodiments of the present invention have been described in detail, those familiar with the art to which this invention relates will recognize various alternative designs and embodiments for practicing the invention as defined by the following claims.

The invention claimed is:

1. A method of detecting seatbelt status in a vehicle comprising:
   (a) taking first seat images with a camera upon detecting the vehicle may begin travel imminently;
   (b) analyzing the first seat images to detect occupants in seats;
   (c) activating LEDs on seatbelt assemblies for the seats with the occupants;
   (d) changing activation of the LEDs for the respective seats with the occupants upon detecting seatbelt engagement for the corresponding seat;
   (e) taking second seat images upon detecting that the vehicle is shifted into gear;
   (f) comparing the first and second seat images; and
   (g) activating an alert when the comparison of first and second seat images indicates improper seatbelt use for one of the seats with the occupants.

2. The method of claim 1 wherein step (a) includes detecting the vehicle may begin travel imminently by detecting that all doors are closed.

3. The method of claim 2 wherein step (a) includes detecting that the vehicle may begin travel imminently by detecting that an ignition is turned on, and the first seat images includes taking a first set of images when the doors are closed and a second set of images when the ignition is turned on.

4. The method of claim 1 wherein step (d) includes detecting the seatbelt engagement by detecting that a tongue is secured into a corresponding seatbelt buckle.

5. The method of claim 1 wherein step (d) includes turning off the LEDs for each of the respective seats when the seatbelt engagement is detected.

6. The method of claim 1 wherein step (d) includes changing the color of the LEDs for each of the respective seats when the seatbelt engagement is detected.

7. The method of claim 1 further including:
   (h) monitoring for seatbelt engagement while the vehicle is traveling;
   (i) upon detecting seatbelt misusage, illuminating the LEDs for the corresponding seat and taking additional seat images with the camera; and
   (j) activating the alert when the comparison of second and additional seat images indicates improper seatbelt use for one of the seats with the occupants.

8. The method of claim 1 wherein step (a) includes: detecting the occupants entering the vehicle prior to taking the first seat images.

9. The method of claim 1 further including:
   (h) detecting a camera system fault; and
   (i) activating a camera fault alert.

10. The method of claim 1 further including:
    (h) detecting a LED system fault; and
    (i) activating a LED fault alert.

11. The method of claim 1 further including:
    (h) detecting a camera system fault and an LED system fault;
    (i) activating a fault alert; and
    (j) employing a seatbelt status from immediately prior to the camera and LED system faults.

12. A method of detecting seatbelt status in a vehicle comprising:
    (a) detecting occupants entering the vehicle;
    (b) taking first seat images with a camera upon detecting all doors of the vehicle are closed;
    (c) taking second seat images with the camera upon detecting an ignition is turned on;
    (c) analyzing the first and second seat images to detect occupants in seats;

(d) activating LEDs on seatbelt assemblies for the seats with the occupants;
(e) changing activation of the LEDs for the respective seats with the occupants upon detecting seatbelt engagement for the corresponding seat;
(f) taking third seat images upon detecting that the vehicle is shifted into gear;
(g) comparing the third seat images to the first and second seat images; and
(h) activating an alert when the comparison of the first, second and third seat images indicates improper seatbelt use for one of the seats with the occupants.

13. The method of claim 12 wherein step (e) includes detecting the seatbelt engagement by detecting that a tongue is secured into a corresponding seatbelt buckle.

14. The method of claim 12 wherein step (e) includes turning off the LEDs for each of the respective seats when the seatbelt engagement is detected.

15. The method of claim 12 further including:
(i) monitoring for seatbelt engagement while the vehicle is traveling;
(j) upon detecting seatbelt misusage, illuminating the LEDs for the corresponding seat and taking additional seat images with the camera; and
(k) activating the alert when the comparison of third and additional seat images indicates improper seatbelt use for one of the seats with the occupants.

* * * * *